(12) United States Patent
Jiang et al.

(10) Patent No.: US 9,692,294 B2
(45) Date of Patent: Jun. 27, 2017

(54) MAIN SWITCH CONTROL CIRCUIT IN POWER FACTOR CORRECTION CIRCUIT

(71) Applicant: INVENTRONICS (HANGZHOU), INC., Hangzhou, Zhejiang (CN)

(72) Inventors: Delai Jiang, Hangzhou (CN); Liang'an Ge, Hangzhou (CN); Lian Wu, Hangzhou (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 0 days.

(21) Appl. No.: 14/764,605

(22) PCT Filed: Dec. 4, 2013

(86) PCT No.: PCT/CN2013/088493
§ 371 (c)(1),
(2) Date: Jul. 30, 2015

(87) PCT Pub. No.: WO2014/117596
PCT Pub. Date: Aug. 7, 2014

(65) Prior Publication Data
US 2015/0372588 A1    Dec. 24, 2015

(30) Foreign Application Priority Data
Feb. 1, 2013    (CN) .......................... 2013 1 0045719

(51) Int. Cl.
*H02M 1/42*    (2007.01)
(52) U.S. Cl.
CPC ....... *H02M 1/4208* (2013.01); *H02M 1/4225* (2013.01); *Y02B 70/126* (2013.01); *Y02P 80/112* (2015.11)

(58) Field of Classification Search
None
See application file for complete search history.

(56) References Cited

U.S. PATENT DOCUMENTS 7,359,224 B2    4/2008    Li
9,077,260 B2 *  7/2015    Zhao ................... H02M 1/4225
(Continued)

FOREIGN PATENT DOCUMENTS

CN    101185044 A    5/2008
CN    102368661 A    3/2012
(Continued)

OTHER PUBLICATIONS

International Search Report (English and Chinese) and Written Opinion of the ISA (Chinese) for PCT/CN2013/088493, ISA/CN, mailed Mar. 13, 2014, with English translation thereof.
(Continued)

*Primary Examiner* — Jeffrey Gblende
(74) *Attorney, Agent, or Firm* — Harness, Dickey & Pierce, P.L.C.

(57) ABSTRACT

A control circuit in a power factor correction (PFC) circuit includes: a multiplier, used for multiplying a voltage sampling signal by a feedback signal, and outputting a first signal; and a waveform generating module, used for generating a second signal related to a filter capacitor connected in parallel to an input end and/or an output end of a rectifier bridge. A control signal for controlling a state of a main switch transistor is generated by using the first signal, the second signal, and a current sampling signal of the main switch transistor in the PFC circuit.

14 Claims, 5 Drawing Sheets

(56) References Cited

U.S. PATENT DOCUMENTS

| | | | |
|---|---|---|---|
| 2006/0245219 A1 | 11/2006 | Li | |
| 2010/0246227 A1* | 9/2010 | Shimizu | H02M 3/156 363/126 |
| 2012/0262132 A1 | 10/2012 | Park et al. | |
| 2013/0163300 A1 | 6/2013 | Zhao et al. | |
| 2013/0308347 A1* | 11/2013 | Sato | H02M 3/337 363/21.03 |

FOREIGN PATENT DOCUMENTS

| | | |
|---|---|---|
| CN | 102437727 A | 5/2012 |
| CN | 102594169 A | 7/2012 |
| JP | 2008211881 A | 9/2008 |

OTHER PUBLICATIONS

First Chinese Office Action regarding Application No. 201310045719.2 dated Nov. 19, 2015. English translation provided by Unitalent Attorneys at Law.

\* cited by examiner

MAIN SWITCH CONTROL CIRCUIT IN POWER FACTOR CORRECTION CIRCUIT

The present application is the US national phase of International Application No. PCT/CN2013/088493 filed on Dec. 4, 2013, which claims the priority to Chinese Patent Application No. 201310045719.2, entitled "CONTROL CIRCUIT IN POWER FACTOR CORRECTION CIRCUIT", filed on Feb. 1, 2013 with the State Intellectual Property Office of People's Republic of China, which are incorporated herein by reference in their entireties.

FIELD

The disclosure relates to the field of power factor correction technology, particularly, a control circuit in a power factor correction circuit.

BACKGROUND

In a two-stage or single-stage power factor correction (PFC) circuit, generally, the product of a sampled output voltage of a rectifier bridge and a feedback signal of an output terminal of the PFC circuit is used as a reference signal of a current of a switch in the PFC circuit.

Figure 1:
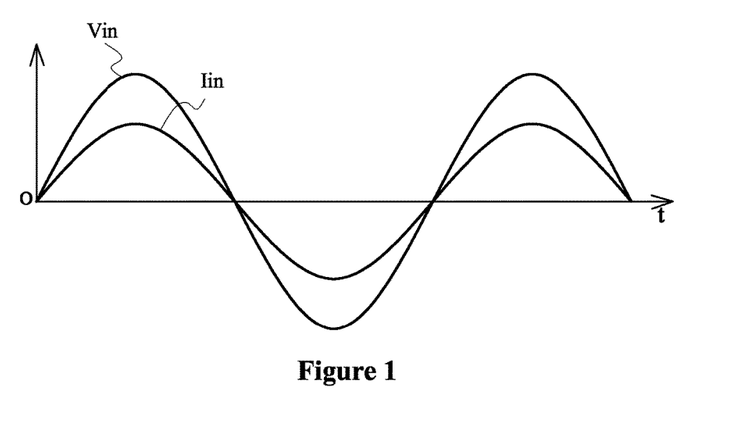
FIG. 1 is a schematic diagram which shows a case that an input current Iin (at an alternating current input terminal) and an output voltage Vin have a same phase in the conventional technology.

In this way, the input current in the PFC circuit changes with the input voltage, and for the entire circuit, and the phase of the input current Iin (at an alternating current input terminal) is the same as that of the input voltage Vin. FIG. 1 is a schematic diagram which shows an ideal case that the phase of the input current (at the alternating current input terminal) is the same as that of the output voltage.

To reduce high frequency pollution on an electric network, in conventional technology, generally a filter capacitor is connected to an input terminals or output terminals of the rectifier bridge in parallel, alternatively, filter multiple capacitors are connected to the input terminals and the output terminals of the rectifier respectively in parallel. However, the parallel connection of the filter capacitor may result in a phase difference between the input current Iin (at the alternating input terminal) and the input voltage Vin of the entire circuit, which is caused by the fact that the input current Iin (at the alternating input terminal) of the entire circuit is a sum of a current of the filter capacitor and the input current of the PFC circuit, and the phase of the current of the filter capacitor is heads of the phase of the input voltage by 90 degrees, i.e., due to the filter capacitor, the phase of the input current Iin leads the phase of the input voltage Vin.

Thus the parallel connection of the filter capacitor may result in different phases of the input current Iin and the input voltage Vin, thereby reducing power factor of the power source and increasing harmonic content.

In view of above, how to keep consistency between the phase of the input current Iin and that of the input voltage Vin is a technical problem to be solved by those of skills in the art.

SUMMARY

The disclosure is to provide a control circuit in a power factor correction circuit, which is capable of keeping consistency between a phase of an input current Iin and that of an input voltage Vin.

The control circuit in the power factor correction circuit according to the disclosure includes: a voltage sampling module, an output feedback module, a multiplier, a waveform generation module, a control signal generation module, and a drive control module.

The voltage sampling module is configured to sample an input voltage Vdc of the power factor correction (PFC) circuit, and output a voltage sampling signal Vs.

The output feedback module is configured to sample an output electric parameter of the PFC circuit, compare a sampled output electric parameter with a pre-set value, and output a feedback signal Vf according to a comparison result.

The multiplier is configured to multiply the voltage sampling signal Vs by the feedback signal Vf, and output a first signal I1.

The waveform generation module is configured to generate a second signal I2 which is related to a current of a filter capacitor connected to input terminals and/or output terminals of a rectifier bridge in parallel respectively.

The control signal generation module is configured to output a control signal according to a current sampling signal Is of a main switch of the PFC circuit, the first signal I1 and the second signal I2.

The drive control module is configured to drive the main switch according to the control signal output by the control signal generation module, and a control conducting duration of the main switch.

Preferably, the a period of second signal I2 is the same as that of the first signal I1, and amplitude of the second signal I2 is reduced from a positive value to a negative value in one period.

Preferably, the control signal generation module includes: an addition unit and a comparator;

the second signal I2 and the current sampling signal Is of the main switch of the PFC circuit are input into two input terminals of the addition unit respectively, and the addition unit is configured to add the second signal I2 and the current sampling signal Is, and input a sum of the second signal I2 and the current sampling signal Is into an input terminal of the comparator;

the first signal I1 is input into another input terminal of the comparator; and the comparator outputs the control signal to the drive control module.

Preferably, the control signal generation module includes: a subtraction unit and a comparator;

the first signal I1 and the second signal I2 are input into two input terminals of the subtraction unit respectively, and the subtraction unit is configured to subtract the second signal I2 from the first signal I1, and input a difference between the second signal I2 and the first signal I1 into an input terminal of the comparator;

the current sampling signal Is of the main switch in the PFC circuit is input into another input terminal of the comparator; and the comparator outputs the control signal to the drive control module.

Preferably, the control signal generation module includes: an inverter, an addition unit and a comparator;

the inverter inverts the second signal I2, to acquire an third signal I2';

the first signal I1 and the third signal I2' are input into two input terminals of the addition unit respectively, and the addition unit is configured to add the third signal I2' and the first signal I1, and input a sum of the first signal I1 and the third signal I2' to an input terminal of the comparator;

the current sampling signal Is of the main switch in the PFC circuit is input into another input terminal of the comparator; and the comparator outputs the control signal to the drive control module.

Preferably, the waveform generation module includes a capacitor and a resistor, which are connected in series; and the capacitor and the resistor, which are connected to each other in series, and connected to the output terminals of the rectifier bridge in parallel; and a signal generated at the resistor Rb is used as the second signal I2.

Preferably, the control circuit further includes: a filtering module, the second signal I2 output by the waveform generation module is filtered and output by the filtering module.

Preferably, the adder includes a second resistor and a third resistor;

the current sampling signal Is of the main switch in the main PFC circuit is input into an input terminal of the comparator through the second resistor; and the second signal I2 or the third signal I2' is input into another input terminal of the comparator through the third resistor.

Preferably, the subtraction unit includes an amplifier, a fourth resistor and a fifth resistor;

the first signal I1 is input into an non-inverting input terminal of the amplifier;

the second signal I2 is input into an inverting input terminal of the amplifier through the fourth resistor; and a terminal of the fifth resistor is connected to the inverting input terminal of the amplifier and the other terminal of the fifth resistor is connected to the output terminal of the amplifier.

Preferably, there is a positive correlation between a capacitance of the filter capacitor and the capacitance of the capacitor in the waveform generation module.

Compared with conventional technology, the disclosure has following advantages.

With the control circuit of the power factor correction circuit according to the embodiments of the disclosure, the waveform generation circuit is used to generate the second signal I2 related to the current of the filter capacitor, and the control signal for controlling the state of the main switch is generated from the first signal I1, the second signal I2 and the current sampling signal Is of the main switch in the PFC circuit. By controlling switching of the main switch, a sum (i.e., an input current Iin of an alternating current side) of an input current Ip of the PFC circuit and a total filtering current Ic has a same phase as that of an input voltage Vin, thereby avoiding different phases between Iin and Vin caused by the phase difference resulting from the filter capacitor.

DETAILED DESCRIPTION

To make the purpose, features and merits more apparently and understandably, the embodiments of the disclosure are described in detail in the following in conjunction with drawings.

First Embodiment

Figure 2:
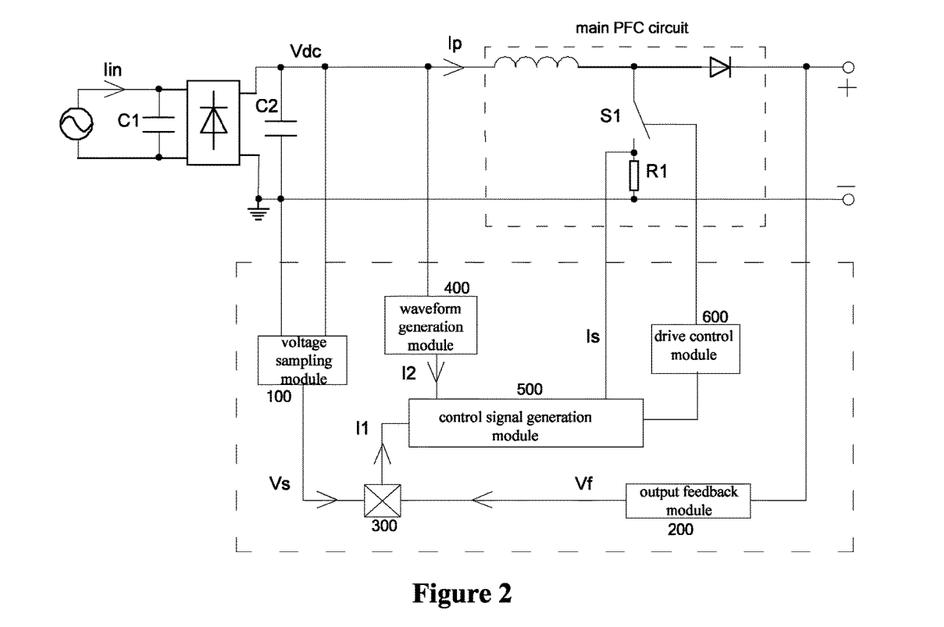
FIG. 2 is a schematic diagram of a control circuit in a power factor correction circuit according to a first embodiment of the disclosure.

FIG. 2 is a schematic diagram of a control circuit in a power factor correction circuit according to the first embodiment of the disclosure.

The control circuit in the power factor correction circuit according to the disclosure includes: a voltage sampling module 100, an output feedback module 200, a multiplier 300, a waveform generation module 400, a control signal generation module 500, and a drive control module 600.

The voltage sampling module 100 is configured to sample an input voltage Vdc of the power factor correction (PFC) circuit, and output a voltage sampling signal Vs.

It is should be noted that in the embodiment, taking a case that the PFC circuit is a boost circuit as an example, the PFC circuit includes an inductance, a diode, a main switch S1 and a first resistor R1. It is can be understood that the PFC circuit may be other DC-DC circuit. In addition, the PFC circuit may be a constant voltage output circuit, a DC-DC constant current output circuit is connected to the PFC circuit on a post stage of the PFC circuit; alternatively, the PFC circuit may be a single-stage constant current outputting circuit.

The output feedback module 200 is configured to sample an output electric parameter, compare a sampled output electric parameter with a pre-set value, and output a feedback signal Vf according to a comparison result.

It is should be noted that the sampled output electric parameter may be an output voltage or an output current of the PFC circuit.

The multiplier 300 is configured to multiply the voltage sampling signal Vs by the feedback signal Vf, and output a first signal I1.

The waveform generation module 400 is configured to generate a second signal I2 which is related to a current of a filter capacitor connected to an input terminal and/or an output terminal of a rectifier bridge in parallel respectively.

It is should be noted that I2 is related to the current of the filter capacitor refers to that I2 is directly proportionally to the current of the filter capacitor, or I2 has a similar waveform as that of the current of the filter capacitor. It is can be understood that I2 have a same waveform as that of the current of the filter capacitor; in a practical circuit, due to electrical components, generally, two waveforms are seldom same and are roughly similar.

It is should be noted that the filter capacitor may be connected to the output terminal of the rectifier bridge in parallel, alternatively, multiple filter capacitors are connected to the output terminal and input terminal of the rectifier bridge in parallel respectively.

The control signal generation module 500 is configured to output a control signal according to a current sampling signal Is of a main switch of the PFC circuit, the first signal I1 and the second signal I2.

The drive control module 600 is configured to drive the main switch according to the control signal output by the control signal generation module 500, and control a conducting duration of the main switch.

The conducting duration of the main switch refers to a time period in which the main switch is conducting. i.e., a time interval from the moment that the main switch is switched on to the moment that the main switch is switched off.

The bottom half of FIG. 2 in the dashed box shows the control circuit according to the embodiment of the disclosure.

With the control circuit of the power factor correction circuit according to the embodiment, the waveform generation circuit is used to generate the second signal I2 related to the current of the filter capacitor, and the control signal for controlling the state of the main switch is generated from the first signal I1, the second signal I2 and the current sampling signal Is of the main switch in the PFC circuit. By controlling switching of the main switch, a sum (i.e., an input current Iin of an alternating current side) of an input current Ip of the PFC circuit and a total filtering current Ic has a same phase as that of an input voltage Vin, thereby avoiding different phases between Iin and Vin caused by the phase difference resulting from the filter capacitor.

Second Embodiment

The operating principle of the control circuit according to the disclosure is described below by taking the case that the control signal generation module includes a subtraction unit as an example.

Figure 3:
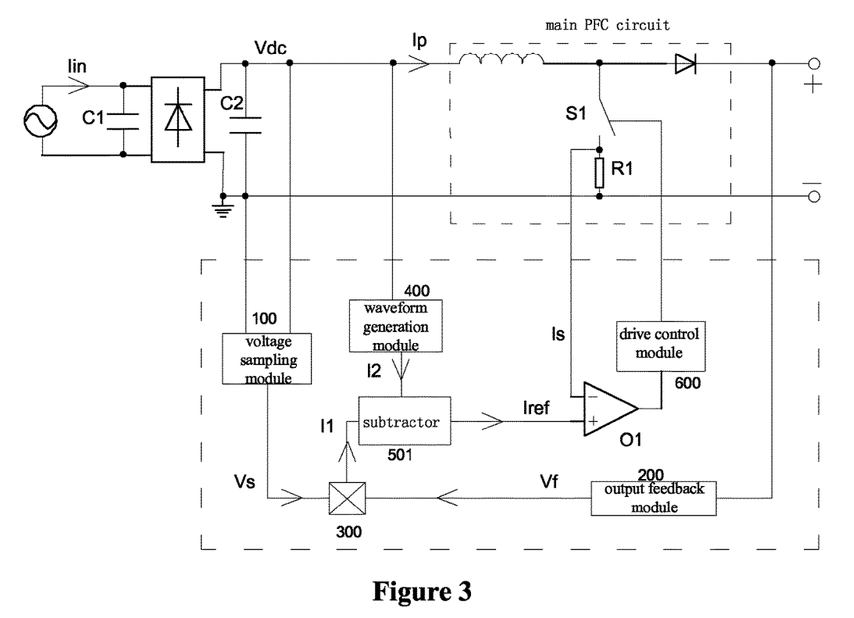
FIG. 3 is a schematic diagram of a control circuit in a power factor correction circuit according to a second embodiment of the disclosure.

FIG. 3 is a schematic diagram of a control circuit in a power factor correction circuit according to the second embodiment of the disclosure.

A control signal generation module according to the embodiment includes: a subtraction unit 501 and a comparator O1.

The first signal I1 and the second signal I2 are input into two input terminals of the subtraction unit 501 respectively. The subtraction unit 501 is configured to input a difference between the second signal I2 and the first signal I1, to an input terminal of the comparator O1. It is should be noted that the difference is used as a reference signal of Is, and is input into an non-inverting input terminal of the comparator O1.

A current sampling signal Is of the main switch in the PFC circuit is input into another input terminal of the comparator O1, which is an inverting input terminal of the comparator O1. It is should be noted that Is may be input into the non-inverting or inverting input terminal of the comparator O1 according to logic requirement, which is not limited herein, and the circuit may be modified as the input terminal is changed, which is common knowledge in the art and is not described.

The comparator O1 is configured to output a control signal to the drive control circuit 600.

A sum of an input current Ip of the PFC circuit and a total filtering current Ic equals to an input current Iin of an alternating current side. The drive control circuit 600 is configured to control a current peak of the main switch S1 by controlling a conducting duration of the main switch S1, to make a phase of the input current Iin has a same phase as that of an input voltage Vin.

As shown in FIG. 3, in this embodiment, a voltage sampling signal Vs and a feedback signal Vf are input into the multiplier 300, and then though multiplication, the multiplier 300 outputs I1, which has a similar waveform and a same phase as those of the voltage sampling signal Vs.

A signal output by the waveform generation module 400 is related to the current Ic (which is the sum of currents of all filter capacitors which include the filter capacitor connected to the input terminal of the rectifier bridge and the output terminal of the rectifier bridge) for the filter capacitors, and has a same phase as that of the current Ic for the filter capacitors.

A signal Iref acquired by subtracting I2 from I1 is used as a reference signal of the current peak of the main PFC circuit, to make the phase of the input current Ip of the PFC circuit is a phase difference between I1 and I2, and the total input current Iin is a sum of Ip and Ic, thus the phase of the total current Iin as the same as that of the input voltage Vin.

Figure 4:
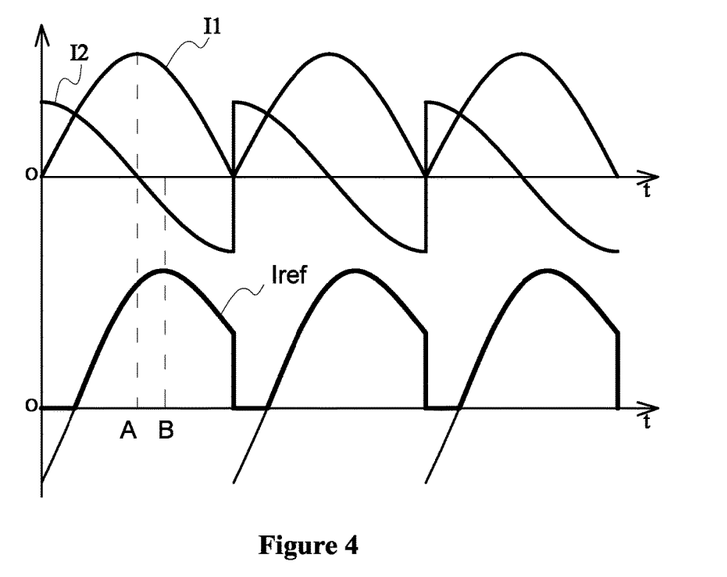
FIG. 4 shows waveform diagrams of main currents shown in FIG. 3.

FIG. 4 shows waveform diagrams of the currents shown in FIG. 3.

It is can be seen from FIG. 4, the period of the second signal I2 is the same as that of the first signal I1, and the amplitude of the second signal I2 is changed from a positive value to a negative value in one period.

According to the embodiment as shown in FIG. 3, Iref is a difference between I1 and I2, and FIG. 4 shows the waveform of Iref.

The peak of I1 is at time point A, the peak of Iref is at time point B, it is can be seen that the phase of Iref lags behind that of I1.

It is should be noted that in a practical application, in a case that the direction of the input current Ip of the PFC circuit may only be the direction shown in FIG. 3, the part of waveform which is less than zero should be modified to be equal to zero, as shown in FIG. 4. In this way, the input current Ip of the PFC circuit has a similar waveform as that of Iref.

Figure 5:
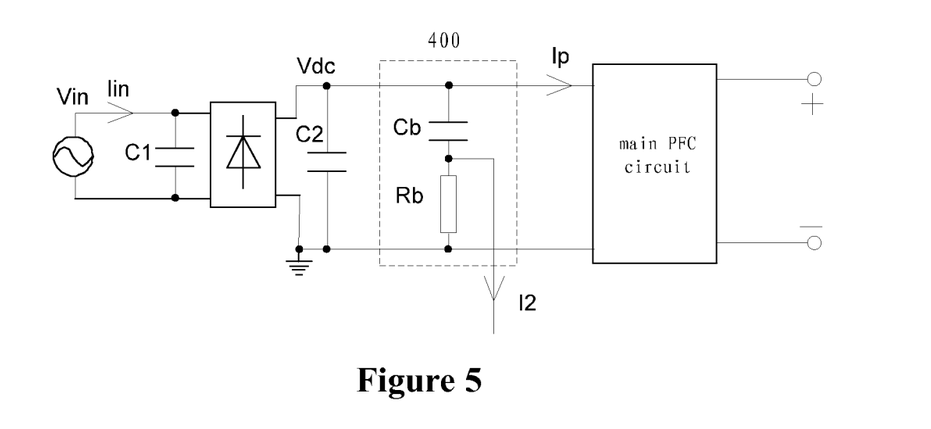
FIG. 5 is a schematic diagram of a waveform generation module according to an embodiment of the disclosure.

FIG. 5 is a schematic diagram of a waveform generation module according to an embodiment of the disclosure.

The waveform generation module includes a capacitor Cb and a resistor Rb, which are connected to each other in series.

The capacitor Cb and the resistor Rb, which are connected to each other in series, and connected to the output terminals of the rectifier bridge in parallel; a signal generated at the resistor Rb is used as the second signal I2.

It is should be noted that, in other embodiment, the waveform generation module may further include a filtering module.

The second signal I2 output by the waveform generation module is filtered and output by the filtering module. For example, I2 shown in FIG. 5 is filtered by the filtering module and then output to the subtraction unit.

It is should be noted that, the capacitor Cb may alternatively be the filter capacitor C2 itself, i.e., the filter capacitor C2 and the resistor Rb are connected to each other in series, and are connected to the rectifier bridge in parallel. The signal at the resistor Rb is used as the second signal I2.

It is should be noted that the capacitance of the capacitor Cb is related to the capacitances of the filter capacitors C1 and C2, that is, the capacitances of the filter capacitors C1 and C2 are in positive correlation to the capacitance of the capacitor Cb. The capacitance of the capacitor Cb depends on the capacitances of the filter capacitors C1 and C2. In a case that a sum of the capacitances of the filter capacitors increases, the input current Iin and the input voltage Vin may have a same phase by increasing the capacitance of the capacitor Cb.

It is should be noted that the waveform generation circuit may be implemented by a digital circuit to generate a waveform in direct proportion to the waveform of the total current for the filter capacitors.

The principle of the control circuit according to the disclosure is described below in conjunction with the drawings in detail.

According to the embodiment, I1 is directly proportional to the input voltage Vdc, I2 is directly proportional to the currents of the filter capacitors, and in a half period of the input voltage, the period of the I1 is the same as that of I2, and the phase difference between I1 and I2 is 90 degrees. Thus it is assumed that $$I1 = k1 * \sin \omega t \tag{1},$$

$$I2 = k2 * \cos \omega t \tag{2}, \text{ and}$$

$$I1 - I2 = k1 * \sin \omega t - k2 * \cos \omega t = \sqrt{k1^2 + k2^2} \sin(\omega t - \alpha) \tag{3},$$

where in formula (3), $\cos \alpha = k1/\sqrt{k1^2 + k2^2}$, and $\sin \alpha = k2/\sqrt{k1^2 + k2^2}$.

In a case that the amplitude of I2 output by the waveform generation module increases, i.e., k2 increases, then $\sin \alpha$ increases, $\alpha$ increases, and a phase difference between $\sqrt{k1^2 + k2^2} \sin(\omega t - \alpha)$ and $k1 * \sin \omega t$ increase, i.e., in FIG. 4, the distance between point A and point B increases.

The amplitude of I2 may be increased by increasing the amplitude of the input voltage Vin. In a case that the amplitude of the input voltage Vin increases, the current of the capacitor Cb increases, and the amplitude of I2 increases. In this case, the phase difference between the reference signal Iref of the switch of the PFC circuit and the input voltage Vdc increases. That is, in a case that the proportion of the current Ic for the filter capacitors in the total input current Iin increases, the phase difference between the reference signal Iref and the input voltage Vdc of the PFC circuit increases, which offsets phase change of the total input current Iin caused by the change of the total current for the filter capacitors. The control circuit according to the disclosure may eliminate the phase difference caused by the filter capacitors, no matter what the amplitude of the input voltage Vin is.

The amplitude of I2 may increase by increasing the frequency f of the input voltage Vin. In a case that frequency f of the input voltage Vin increases, the current of the capacitor Cb increases, and the amplitude of I2 increases. In this case, the phase difference between the reference signal Iref of the switch of the PFC circuit and the input voltage Vdc increases. That is, in a case that the proportion of the current Ic for the filter capacitors in the total input current Iin increases, the phase difference between the reference signal Iref and the input voltage Vdc of the PFC circuit increases, which offsets phase change of the total input current Iin caused by the change of the total current for the filter capacitors. The control circuit according to the disclosure may eliminate the phase difference caused by the filter capacitors, no matter what the frequency of the input voltage Vin is.

It is should be noted that the control signal generation module of the control circuit shown in FIG. 3 includes the subtraction unit. The disclosure further provide an embodiment, in which the control signal generation module includes an addition unit, the operating principle of the control circuit is illustrated below in conjunction with a circuit diagram.

Third Embodiment

Figure 6:
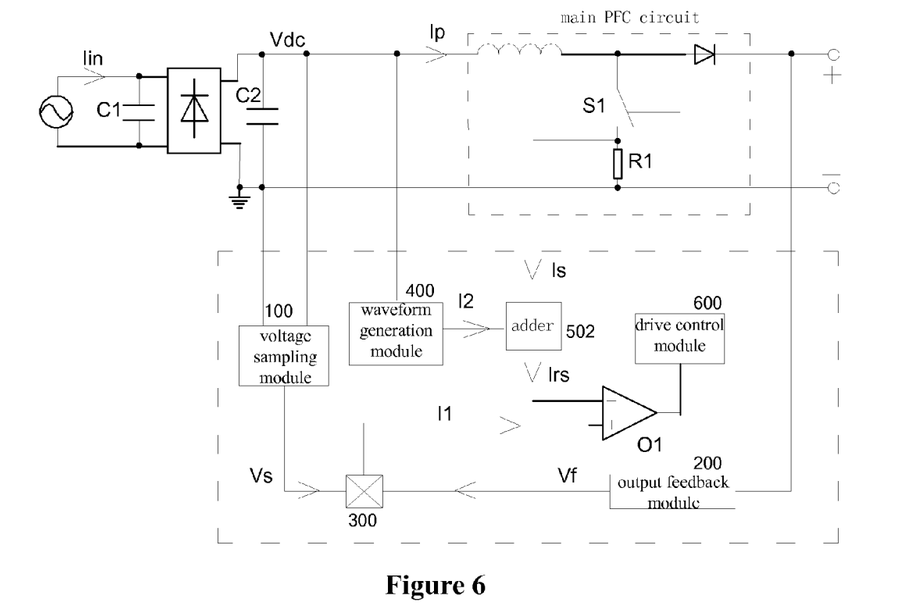
FIG. 6 is a schematic diagram of a control circuit in a power factor correction circuit according to a third embodiment of the disclosure.

FIG. 6 is a schematic diagram of a control circuit in a power factor correction circuit according to the third embodiment of the disclosure.

The control signal generation module includes: an addition unit 502 and a comparator O1.

The second signal I2 and the current sampling signal Is of the main switch of the PFC circuit are input into two input terminals of the addition unit 502 respectively, and the addition unit 502 is configured to add I2 and Is and input the sum thereof into an input terminal of the comparator O1.

The first signal I1 is input into another input terminal of the comparator O1.

The comparator O1 outputs the control signal to the drive control module 600.

In this embodiment, the current sampling signal Is is compensated (or superimposed) with the second signal I2 through the addition unit 502, and the compensated current sampling signal Is is compared with the first signal I1, which is used as a current reference signal. In this way, the current of the main switch S1 is acquired by removing the total current for the filter capacitors from I1 (which has a same phase as that of the input voltage Vdc), so that a sum current (i.e., the total input current Iin) of the input current Ip of the main PFC circuit and the total current Ic of the filter capacitors has a same phase as that of the input voltage Vin, thereby eliminating the phase difference caused by the filter capacitors C1 and/or C2.

Figure 7:
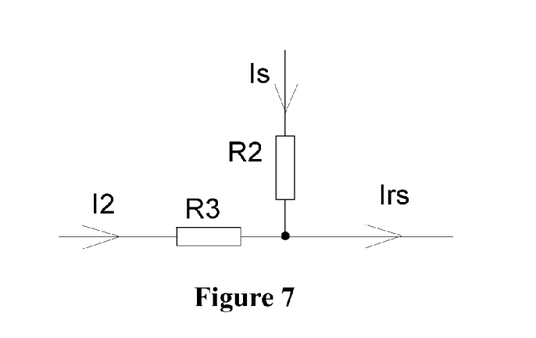
FIG. 7 is a schematic diagram of an addition unit according to an embodiment of the disclosure.

FIG. 7 is a schematic diagram of an addition according to an embodiment of the disclosure.

The addition unit includes a second resistor R2 and a third resistor R3.

The current sampling signal Is of the main switch in the main PFC circuit is input into an input terminal of the comparator through the second resistor R2, and the second signal I2 is input into the other input terminal of the comparator through the third resistor R3.

Figure 8:
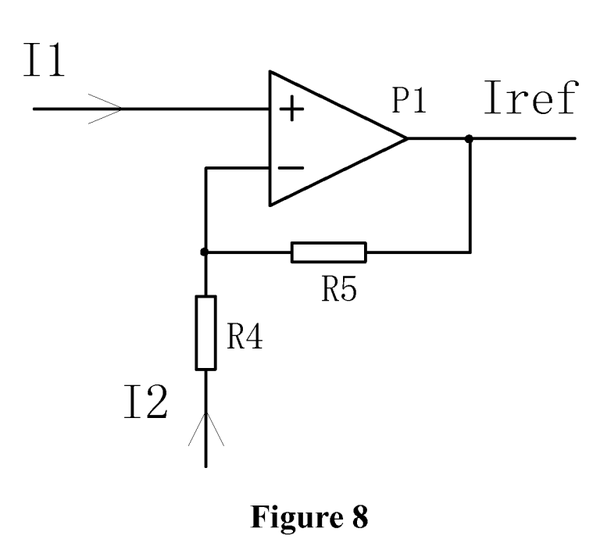
FIG. 8 is a schematic diagram of a subtraction unit according to an embodiment of the disclosure.

FIG. 8 is a schematic diagram of a subtraction unit according to an embodiment of the disclosure.

The subtraction includes an amplifier P1, a fourth resistor R4 and a fifth resistor R5.

The first signal I1 is input into a non-inverting input terminal of the amplifier P1.

The second signal I2 is input into an inverting input terminal of the amplifier P1 through the fourth resistor R4.

One terminal of the fifth resistor R5 is connected to the inverting input terminal of the amplifier P1, and another terminal of the fifth resistor R5 is connected to the output terminal of the amplifier P1.

It is should be noted that the subtraction 501 shown in FIG. 3 may alternatively be an addition unit with two input terminals into which the signal I1 and I2' are input respectively, where I2' is an inversion signal of I2 related to the currents of the filter capacitors.

Specifically, I2' may be generated in a circuit in which I2 is generated by the waveform generation module shown in FIG. 3, then is input into an inverter, the inverter outputs the third signal I2', I2' is input into an addition circuit and added to signal I1, and the addition circuit outputs the signal Iref.

The foregoing embodiments are only preferred embodiments of the disclosure and are not meant to limit the disclosure. Those of skills in the art may make, based on the disclosed method and technical content, some variations and improvements on the technical solutions of the disclosure, or make some equivalent variations on the embodiments without departing from the scope of the technical solutions. All simple modifications, equivalent variations and improvements made based on the technical essence of the disclosure without departing from the content of the technical solutions of the disclosure fall in the scope of the technical solutions of the disclosure.

The invention claimed is:

1. A control circuit in a power factor correction circuit, comprising a voltage sampling module, an output feedback module, a multiplier, a waveform generation module, a control signal generation module, and a drive control module, wherein:
the voltage sampling module is configured to sample an input voltage Vdc of the power factor correction (PFC) circuit, and output a voltage sampling signal Vs;
the output feedback module is configured to sample an output electric parameter of the PFC circuit, compare a sampled output electric parameter with a pre-set value, and output a feedback signal Vf according to a comparison result;
the multiplier is configured to multiply the voltage sampling signal Vs by the feedback signal Vf, and output a first signal I1;
the waveform generation module is configured to generate a second signal I2 which is related to a current of a filter capacitor connected to input terminals and/or output terminals of a rectifier bridge in parallel respectively;
the control signal generation module is configured to output a control signal according to a current sampling signal Is of a main switch of the PFC circuit, the first signal I1 and the second signal I2, so that a current of the main switch is acquired by removing the current of the filter capacitor from the first signal I1; and
the drive control module is configured to drive the main switch according to the control signal output by the control signal generation module, and control a conducting duration of the main switch.

2. The control circuit in the power factor correction circuit according to claim 1, wherein a period of the second signal I2 is the same as that of the first signal I1, and an amplitude of the second signal I2 is reduced from a positive value to a negative value in one period.

3. The control circuit in the power factor correction circuit according to claim 1, wherein the control signal generation module comprises: an addition unit and a comparator, wherein:
the second signal I2 and the current sampling signal Is of the main switch of the PFC circuit are input into two input terminals of the addition unit respectively, and the addition unit is configured to add the second signal I2 and the current sampling signal Is, and input a sum of the second signal I2 and the current sampling signal Is into an input terminal of the comparator;
the first signal I1 is input into another input terminal of the comparator; and
the comparator outputs the control signal to the drive control module.

4. The control circuit in the power factor correction circuit according to claim 1, wherein the control signal generation module comprises: a subtraction unit and a comparator, wherein:
the first signal I1 and the second signal I2 are input into two input terminals of the subtraction unit respectively, and the subtraction unit is configured to subtract the second signal I2 from the first signal I1, and input a difference between the second signal I2 and the first signal I1 into an input terminal of the comparator;
the current sampling signal Is of the main switch in the PFC circuit is input into another input terminal of the comparator; and
the comparator outputs the control signal to the drive control module.

5. The control circuit in the power factor correction circuit according to claim 1, wherein the control signal generation module comprises: an inverter, an addition unit and a comparator, wherein:
the inverter inverts the second signal I2, to acquire a third signal I2';
the first signal I1 and the third signal I2' are input into two terminals of the addition unit respectively, and the addition unit is configured to add the third signal I2' and the first signal I1, and input a sum of the first signal I1 and the third signal I2' to an input terminal of the comparator;
the current sampling signal Is of the main switch in the PFC circuit is input into another input terminal of the comparator; and
the comparator outputs the control signal to the drive control module.

6. The control circuit in the power factor correction circuit according to claim 1, wherein the waveform generation module comprises a capacitor and a resistor, which are connected to each other in series, wherein:
the capacitor and the resistor, which are connected to each other in series, and connected to the output terminals of the rectifier bridge in parallel; and
a signal generated at the resistor is used as the second signal I2.

7. The control circuit in the power factor correction circuit according to claim 6, further comprising a filtering module, wherein:
the second signal I2 output by the waveform generation module is filtered and output by the filtering module.

8. The control circuit in the power factor correction circuit according to claim 3, wherein the addition unit comprises a second resistor and a third resistor, wherein:
the current sampling signal Is of the main switch in the main PFC circuit is input into an input terminal of the comparator through the second resistor; and the second signal I2 or a third signal I2' is input into another input terminal of the comparator through the third resistor.

9. The control circuit in the power factor correction circuit according to claim 4, wherein the subtraction unit comprises an amplifier, a fourth resistor and a fifth resistor;
the first signal I1 is input into an non-inverting input terminal of the amplifier;
the second signal I2 is input into an inverting input terminal of the amplifier through the fourth resistor; and
a terminal of the fifth resistor is connected to the inverting input terminal of the amplifier and the other terminal of the fifth resistor is connected to the output terminal of the amplifier.

10. The control circuit in the power factor correction circuit according to claim 6, wherein there is a positive correlation between a capacitance of the filter capacitor and the capacitance of the capacitor in the waveform generation module.

11. The control circuit in the power factor correction circuit according to claim 2, wherein the control signal generation module comprises: an addition unit and a comparator, wherein:
- the second signal I2 and the current sampling signal Is of the main switch of the PFC circuit are input into two input terminals of the addition unit respectively, and the addition unit is configured to add the second signal I2 and the current sampling signal Is, and input a sum of the second signal I2 and the current sampling signal Is into an input terminal of the comparator;
- the first signal I1 is input into another input terminal of the comparator; and
- the comparator outputs the control signal to the drive control module.

12. The control circuit in the power factor correction circuit according to claim 2, wherein the control signal generation module comprises: a subtraction unit and a comparator, wherein:
- the first signal I1 and the second signal I2 are input into two input terminals of the subtraction unit respectively, and the subtraction unit is configured to subtract the second signal I2 from the first signal I1, and input a difference between the second signal I2 and the first signal I1 into an input terminal of the comparator;
- the current sampling signal Is of the main switch in the PFC circuit is input into another input terminal of the comparator; and
- the comparator outputs the control signal to the drive control module.

13. The control circuit in the power factor correction circuit according to claim 2, wherein the control signal generation module comprises: an inverter, an addition unit and a comparator, wherein:
- the inverter inverts the second signal I2, to acquire an third signal I2';
- the first signal I1 and the third signal I2' are input into two terminals of the addition unit respectively, and the addition unit is configured to add the third signal I2' and the first signal I1, and input a sum of the first signal I1 and the third signal I2' to an input terminal of the comparator;
- the current sampling signal Is of the main switch in the PFC circuit is input into another input terminal of the comparator; and
- the comparator outputs the control signal to the drive control module.

14. The control circuit in the power factor correction circuit according to claim 5, wherein the addition unit comprises a second resistor and a third resistor, wherein:
- the current sampling signal Is of the main switch in the main PFC circuit is input into an input terminal of the comparator through the second resistor; and the second signal I2 or the third signal I2' is input into another input terminal of the comparator through the third resistor.

* * * * *